United States Patent [19]

Kita

[11] Patent Number: 4,983,149
[45] Date of Patent: Jan. 8, 1991

[54] NONSTEP SPEED CHANGE GEAR

[75] Inventor: Yasuo Kita, Kyoto, Japan

[73] Assignee: Shimadzu Corporation, Kyoto, Japan

[21] Appl. No.: 428,431

[22] Filed: Oct. 30, 1989

Related U.S. Application Data

[63] Continuation of Ser. No. 333,813, Apr. 6, 1989, abandoned.

[30] Foreign Application Priority Data

May 20, 1987 [JP] Japan .................. 62-135583

[51] Int. Cl.$^5$ ............................ F16H 47/04
[52] U.S. Cl. ...................... 475/76; 475/79; 475/78; 475/82
[58] Field of Search .......... 74/687, 681, 677, 730, 74/731, 732

[56] References Cited

U.S. PATENT DOCUMENTS

| | | | |
|---|---|---|---|
| 3,411,381 | 11/1968 | Orshansky, Jr. | 74/687 |
| 3,969,958 | 7/1976 | Miyao et al. | 74/687 |
| 3,979,972 | 9/1976 | Sakai et al. | 74/687 |
| 3,988,949 | 11/1976 | Weseloh et al. | 74/687 |
| 4,008,628 | 2/1977 | Orshansky, Jr. | 74/687 |
| 4,313,351 | 2/1982 | Hagin | 74/687 |
| 4,750,381 | 6/1988 | Kita et al. | 74/687 |

FOREIGN PATENT DOCUMENTS

| | | | |
|---|---|---|---|
| 2655011 | 6/1978 | Fed. Rep. of Germany | 74/687 |
| 2820025 | 11/1979 | Fed. Rep. of Germany | 74/731 |
| 2463335 | 3/1981 | France | 74/687 |
| 0079052 | 4/1986 | Japan | 74/687 |
| 2136069 | 9/1984 | United Kingdom | 74/687 |

Primary Examiner—Dirk Wright
Attorney, Agent, or Firm—Armstrong, Nikaido, Marmelstein, Kubovcik & Murray

[57] ABSTRACT

Disclosed is a nonstep speed change gear capable of selecting low speed mode and high speed mode by the low speed side clutch and high speed side clutch, comprising a differential mechanism having a low speed side mechanical transmission line and a high speed side mechanical transmission line formed in parallel, and a fluid transmission mechanism forming a pair of fluid transmission lines of which speed is variable by fluid pump/motor being installed on the way of these mechanical transmission lines, in which when the rotation speed difference of the both clutches becomes close to zero, the operation falls into intermediate lock-up mode so that the both clutches are connected together, and in this mode the displacement of the fluid pump/motor is controlled by the control mechanism so that the differential pressure of the circuits of the fluid transmission lines may be nearly zero.

1 Claim, 4 Drawing Sheets

NONSTEP SPEED CHANGE GEAR

This application is a continuation of application Ser. No. 333,813 filed Apr. 6, 1989.

BRIEF SUMMARY OF THE INVENTION

This invention relates to a nonstep speed change gear widely applicable in various industrial fields such as industrial machines and vehicles.

The so-called hydrostatic speed transmission (HST) is known as a nonstep speed change gear using fluid pump/motor. It is excellent in stepless speed changing property, but is not necessarily high in efficiency, and the speed range is not satisfactory. Accordingly, by combining the HST and differential gear mechanism, it has been attempted to develop a hydrostatic mechanical transmission (HMT) so as to achieve both stepless speed changing property of the HST and the high efficiency of gear transmission, by distributing the power transmission between the HST and differential gear mechanism (references: Hydraulic Engineering, ed. Tomoo Ishihara, 'Asakura Shobo, Theory and Practice of Piston Pump motor, Sadao Ishihara, Corona Co.). That is, this nonstep speed change gear comprises a differential mechanism having a low speed side mechanical transmission line possessing first, second and third input and output ends and passing between the first input, output end and the second input, output end, and a high speed side mechanical transmission line passing between the first input, output end and the third input, output end, a fluid transmission mechanism having an input, output shaft of one fluid pump/motor connected to the second input, output end of this differential mechanism, and having an input, output shaft of the other fluid pump/motor connected to the third input, output end, thereby forming a fluid transmission line of which speed is variable by these pumps/motors, a low speed side clutch having the transmission end of the low speed side mechanical transmission line connected or disconnected at the common rotation element disposed at the input side or output side, and a high speed side clutch having the transmission end of the high speed side mechanical transmission line connected or disconnected at the common rotation element, whereby either the low speed mode or the high speed mode can be selected by opposedly changing over the both clutches.

In such nonstep speed change gear, in the operation region where the speed ratio expressed by the output rotation speed/input rotation speed is smaller than the intermediate setting speed ratio at which the speeds at both transmission ends are equal to each other, the low speed mode for connecting only the low speed side clutch is selected, and when said speed ratio is increased to reach the intermediate speed ratio, the high speed side clutch is connected, and the low speed side clutch is released to transfer to the high speed mode, generally. When transfering from the high speed mode to the low speed mode, a reverse operation is effected. In this construction, there are extremely few occasions of stopping the fluid transmission system which is lower in efficiency than the mechanical transmission system, and it is difficult to further enhance the efficiency of the entire nonstep speed change gear. In this gear, moreover, since a differential pressure is almost always generated between the circuits of the liquid transmission lines, it is also difficult to improve the durability of the fluid pump/motor and other accessories which make up the fluid transmission lines.

It is hence a primary object of this invention to solve these problems.

In order to achieve the above and other objects, this invention is composed as follows.

That is, the nonstep speed change gear of this invention comprises a differential mechanism having a low speed side mechanical transmission line and a high speed side mechanical transmission line formed parallel between input and output ends, a fluid transmission mechanism forming a fluid transmission line of which speed is variable by a pair of fluid pumps/motors with the input and output shaft thereof connected on the way of said mechanical transmission lines, a low speed side clutch having the transmission end of said low speed side mechanical transmission line connected or disconnected at a common rotation element disposed at the input side or output side, and a high speed side clutch having the transmission end of said high speed side mechanical transmission line connected or disconnected at said common rotation element, in which in the operation range where the speed ratio expressed by the output rotation speed/input rotation speed is smaller than the intermediate setting speed ratio at which the rotation speed difference between said low speed side clutch and high speed side clutch is zero, the low speed mode of selecting only the low speed side clutch is selected, and in the operation range where the speed ratio is greater than said intermediate setting speed ratio, the high speed mode for connecting only the high speed side clutch can be selected, wherein:

When said speed ratio becomes closer to the intermediate set speed ratio more than specified, or the rotation speed difference of the low speed side clutch and high speed side clutch becomes smaller than specified, the displacement of the fluid pump/motor is controlled, and by synchronizing the two clutches, the operation is led into the intermediate lock-up mode where the both clutches are mutually engaged, and there is a control mechanism for controlling the displacement of the fluid pump/motors so that the differential pressure between circuits of the fluid transmission lines may be approximately zero in this intermediate lock-up mode.

During operation in low speed mode or high speed mode, when the speed ratio becomes closer to the intermediate setting speed ratio more than specified, or when the difference of rotation speed of low speed side clutch and high speed side clutch is narrowed more than specified, the nonstep speed change control for successively varying the actual rotation speed of the power source in the direction to approach the target rotation speed is interrupted, and the displacement of fluid pump/motor is controlled so that the both clutches may be synchronized, and the operation is forced to be put into intermediate lock-up mode so that the both clutches are connected with each other. In this intermediate lock-up mode, it is controlled so that the differential pressure between the high and low circuits may be approximately zero. Accordingly, the leak loss in the fluid pump/motor and the torque loss is dependent on the pressure decrease. That is, the energy loss in the fluid transmission line is notably decreased, and substantially the power is transmitted only by way of the mechanical transmission line. Hence, in the intermediate lock-up mode, the transmission efficiency of the nonstep speed change gear is improved, and the both fluid pumps/motors may be almost completely liberated from the load.

This invention is constructed as described above, and when approaching the changeover point between the low speed mode and high speed mode, the operation is forced to fall into the intermediate lock-up mode so as to render the differential pressure between circuits of the fluid transmission lines nearly to zero, and therefore the fluid transmission line is substantially stopped, and the occasion of transmitting power only by the mechanical transmission line is effectively increased, so that the efficiency of the entire device may be superbly enhanced. In addition, in such constitution, since the fluid pumps/motors come in unloaded state in the intermediate lock-up mode, so that the durability of the fluid pumps/motors, and other attachments may be enhanced.

DETAILED DESCRIPTION OF THE INVENTION

Figure 1:
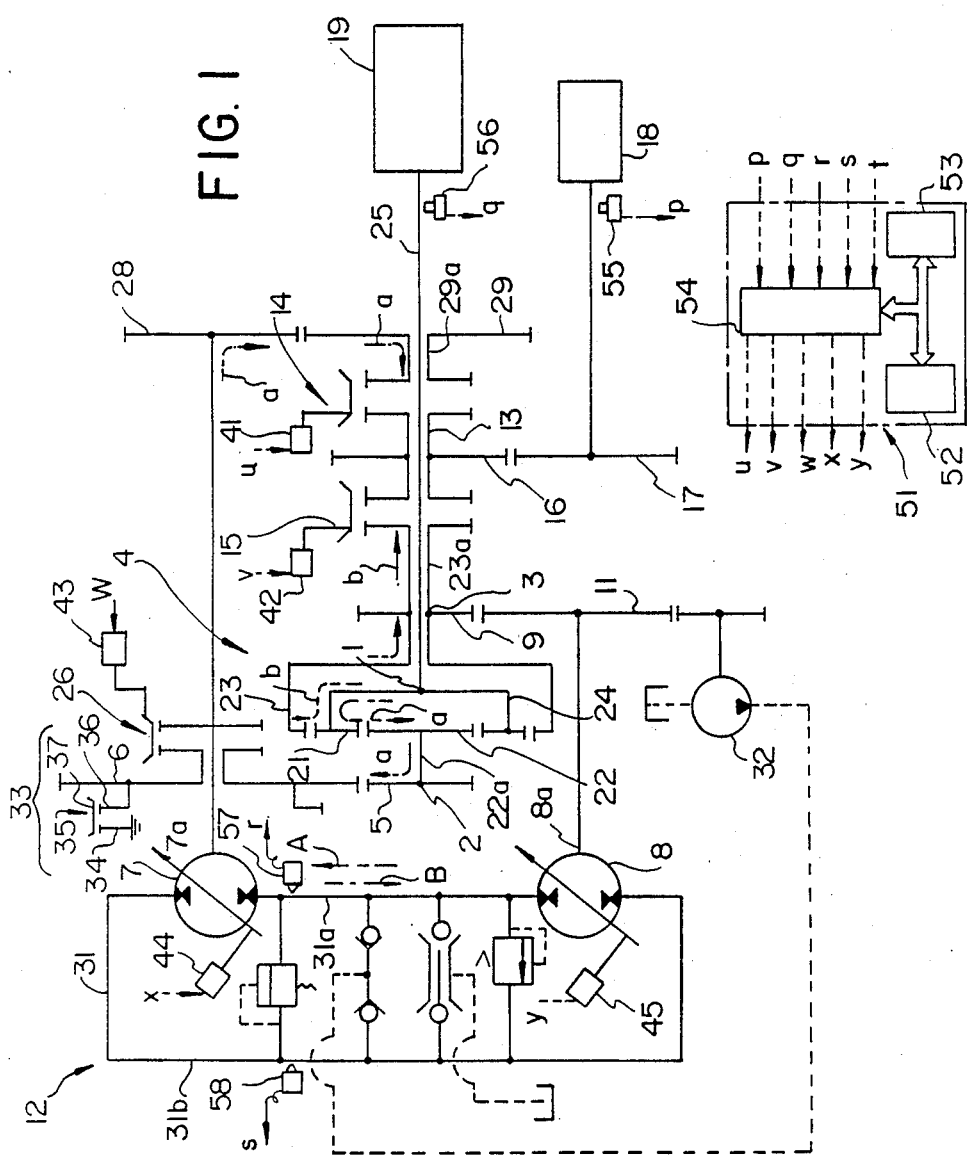
FIG. 1 is a system block diagram.

Referring now to the drawings, one of the embodiments of this invention is described below.

The nonstep speed change gear of this invention comprises, as schematically shown in the drawing, a differential mechanism 4 possessing first, second and third input, output ends 1, 2, 3, and forming parallel a slow speed side mechanical transmission line a passing between said first input, output end 1 and second input, output end 2 and a high speed side mechanical transmission line b passing between said first input, output end 1 and third input, output end 3, a fluid transmission mechanism 12 forming fluid transmission lines A, B of which speed is variable by a pair of pumps/motors 7, 8, having an input, output shaft 7a of one fluid pump/motor 7 connected to the second input, output end 2 of this differential mechanism 4 by way of gears 5, 6, and an input, output shaft 8a of the other fluid pump/motor 8 connected to the third input, output end 3 by way of gears 9, 11, a low speed side clutch 14 having the transmission end of said low speed side mechanical transmission line a connected to a center boss 13 which is a common rotation element, and a high speed side clutch 15 having the transmission end of said high speed side mechanical transmission line b connected to said center boss 13. The center boss 13 is connected to an output shaft (output end) 18 by way of gears 16, 17.

The differential mechanism 4 has a sun gear 22 disposed inside plural planetary gears 21 provided at equal intervals in the circumferential direction, and has a ring gear 23 engaged outside to form a planetary gear system. The center of the gear retainer 24 supporting said each planetary gear 21 is set at said first input, output end 1, and an input shaft (input end) to be connected to a power source 19 is disposed at this input, output end 1. Besides, the end of the support shaft 22a of said sun gear 22 is set at said second input, output end 2, and said gear is affixed to this input, output end 2. The end of the boss 23a of said ring gear 23 is set at said third input, output end 3, and said gear 9 is disposed at this input, output end 3. In this way, the low speed side mechanical transmission line a is composed of planetary gear 21, sun gear 22, gear 5, gear 6, and also forward clutch 26, gear 28, and gear 29 which are described later, and the boss part 29a of the final gear 29 plays the part of transmission end of this mechanical transmission line a. On the other hand, the high speed mechanical transmission line b is composed of said planetary gear 21 and ring gear 23, and the boss part 23a of the ring gear 23 is playing the part of transmission end of this mechanical transmission line b.

The fluid transmission mechanism 12 is structured by a series connection of variable displacement type fluid pump/motor 7 and variable displacement type fluid pump/motor 8 by way of a liquid pressure circuit 31 same as in an ordinary HST, and the input, output shaft 7a of the fluid pump/motor 7 is connected to the support shaft 22a of the sun gear by way of gears 6, 5, while the input, output shaft 8a of the fluid pump/motor 8 is coupled to the ring gear 23. Numeral 32 is a boost pump connected to said liquid pressure circuit 31. Besides, between the second input, output end 2 of the differential mechanism 4 and one fluid pump/motor, there is an output direction changeover mechanism 33. The output direction changeover mechanism 33 has the gear 6 connected to the input, output shaft 7a of one fluid pump/motor 7 by way of the forward clutch 26, and a one-way clutch is disposed between said gear 6 and a fixing member 34. The one-way clutch 35 is designed, for example, to cause a ratches 37 pivoted on the fixing member 34 to be engaged with a ratchet wheel 36, and in forward motion, the rotation of the gear 6 is not arrested, and in backward motion, the rotation of the gear 6 in one direction is prohibited, and the rotation of the second output end 2 of the differential mechanism 4 is arrested.

Incidentally, as said clutches 14, 15, 26, wet or dry multidisc clutches may be used, or the power intermittent mechanism of the so-called synchromesh type may be also employed. These clutches 14, 15, 26 are designed to be operated intermittently by the actuators.

These actuators 41, 42, 43, and actuators 44, 45 for varying the displacement of the liquid pressure pumps/motors 7, 8 are controlled by a computer 51 which is a control mechanism.

The computer 51 is composed of central processing unit 52, various memories 53, and interface 54, in an ordinary microcomputer system. The interface 54 receives signal p from a rotation speed sensor 55 for detecting the output rotation speed, signal q from a rotation speed sensor 56 for detecting the input rotation speed, signal r from a pressure sensor 57 provided in the circuit part 31a of the liquid pressure circuit 31 which becomes a high pressure while the low speed mode is being selected, signal s from a pressure sensor 58 disposed in the circuit part 31b which becomes high pressure while the high speed mode is being selected, and signal t corresponding to the accelerator operating amount for controlling the output rotation of the power source 19. This interface 54 also delivers signal u for actuating the actuator 41 of the low speed side clutch 14, signal v for actuating the actuator 42 of the high speed side clutch 15, signal w for actuating the actuator 43 of the forward clutch 26, and signals x, y for actuating the actuators 44, 45 for controlling the displacement of the liquid pressure pumps/motors 7, 8.

Figure 3:
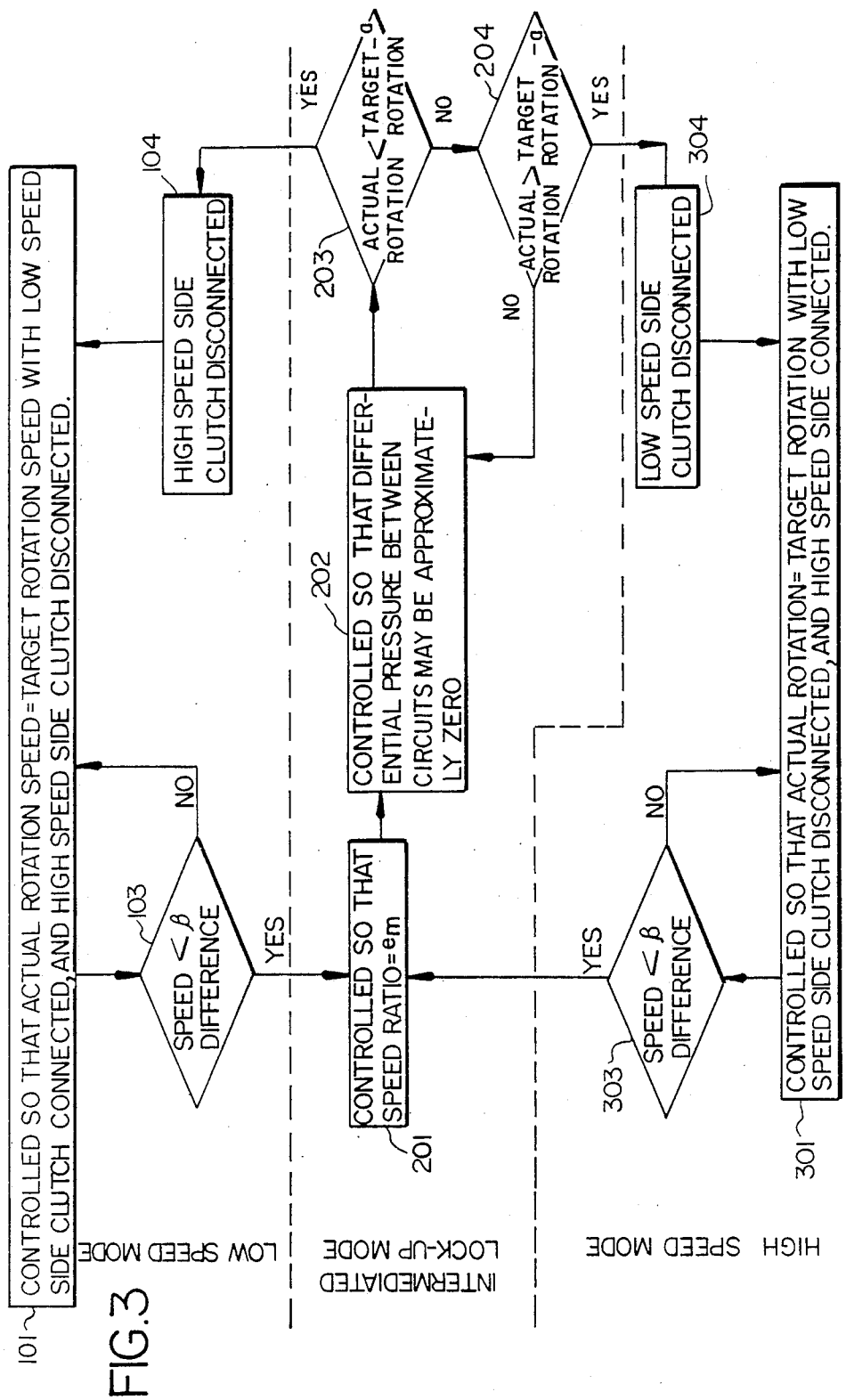
FIG. 3 is a flow chart schematically showing the control.

Inside the memories 53 of the computer 51, a program as schematically shown in FIG. 3 is incorporated in order to execute this invention.

The operation of the nonstep speed change gear in the forward motion of vehicle (the forward clutch 26 being connected) is explained below.

In the operation range where the speed ratio expressed by the output rotation speed/input rotation speed is smaller than the intermediate setting speed ratio $e_m$, only the low speed side clutch 14 is connected, which means the low speed mode (see step 101 in FIG. 3).

Figure 2:
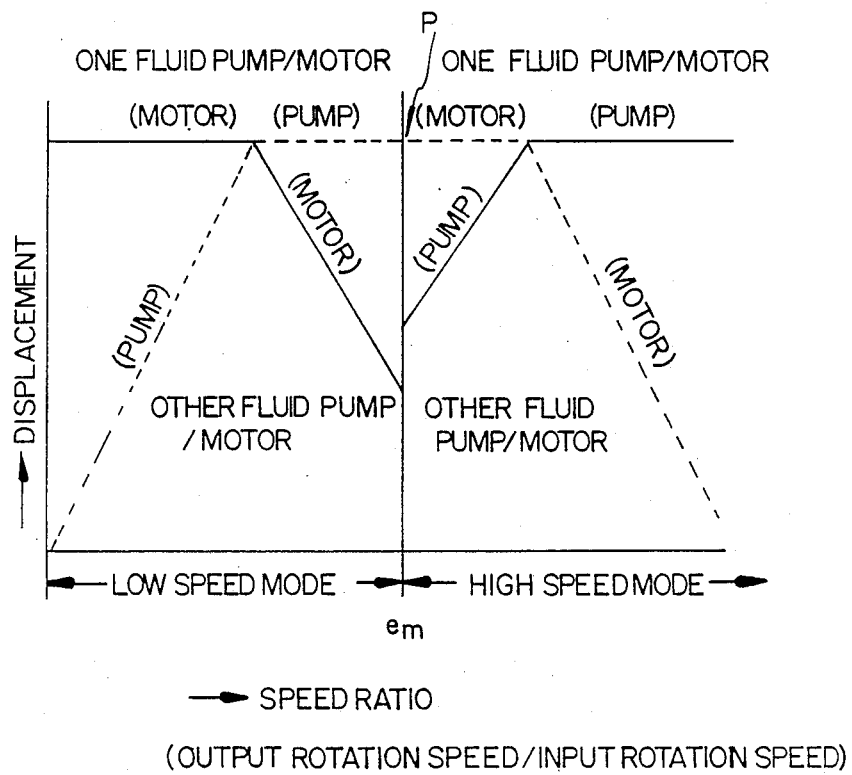
FIG. 2 is an explanatory diagram to explain the mode of control of fluid pump/motor.

Practically, said speed ratio is sequentially calculated on the basis of the output rotation speed detected by the rotation speed sensor 55, and the input rotation speed detected by the rotation speed sensor 56. The intermediate setting speed ratio $e_m$ corresponding to the speed ratio when the transmission end of the low speed side mechanical transmission line a and the transmission end of the high speed side mechanical transmission line b are equalized in speed. In this low speed mode, the input side and output side are directly coupled by way of the low speed side mechanical transmission line a passing between the first input, output end 1 and the second input, output end 2 of said differential mechanism 4, and part of the entered power is directly transmitted to the output shaft 18 through this mechanical transmission line a. At this time, one fluid pump/motor functions as the motor, and the other fluid pump/motor operates as the pump. That is, the torque of the third input, output end 3 of the differential mechanism 4 is transmitted to the output shaft 18 through the fluid transmission line A. In this low speed mode, as shown in FIG. 2, the displacement of the fluid pump/motor 8 is increased, and after reaching the maximum displacement, the displacement of the other fluid pump/motor 7 is gradually decreased, so that the rotation speed of the output shaft 18 increases with respect to the rotation of the input shaft 25. The control of the displacement of the fluid pumps/motors 7, 8 is effected so that the target rotation speed corresponding to the accelerator manipulation amount and the actual rotation speed of the prime mover 19 detected by the rotation speed sensor 56 may be equal to each other, by delivering operation command signals to the actuators 44, 45. Meanwhile, the target rotation speed shown above is to correspond, for example, to the rotation speed of the prime mover 19 so that the fuel expense may be most preferable corresponding to each accelerator manipulation amount, and by preliminarily determining by experiment, the values are tabulated and stored in the memories 53. Therefore, the target rotation speed in each state of operation is selected according to the signal t corresponding to the sequential inputs of accelerator manipulation amount.

In such low speed mode, when the rotation speed difference between the low speed side clutch 14 and high speed side clutch 15 becomes less than a specified value of $\beta$ (step 103 in FIG. 3), the operation is transferred to the intermediate lock-up mode. That is, when transferring to the intermediate lock-up mode, the displacement of the fluid pump/motor 7 is controlled to synchronize the low speed side clutch 14 with the high speed side clutch 15, and then not only the low speed side clutch 14 but also the high speed side clutch 15 are connected (step 201 in FIG. 3), and the speed ratio is locked to be the intermediate setting speed ratio $e_m$. Immediately after that, the displacement of the fluid pump/motor 7 is controlled, and the differential pressure between circuits of fluid transmission lines A, B, that is, the differential pressure between both circuit parts 31a, 31b is controlled to zero (step 202 in FIG. 3). Thus, this control is to operate the actuator 44 so that the detection values by the pressure sensors 57, 58 disposed in the circuit parts 31a, 31b of the fluid transmission mechanism 12 may be equal to each other (point P in FIG. 2).

In this intermediate lock-up mode, if the actual rotation speed of the prime mover 19 detected by the rotation speed sensor 56 exceeds the target rotation speed determined in correspondence with the accelerator manipulation amount over a specified width of $\alpha$ (step 204 in FIG. 3), the low speed side clutch 14 is disengaged to transfer to the high speed mode (step 304 in FIG. 3). In this case, the actual rotation speed exceeding the target rotation speed by a specified width of $\alpha$ means to include the state of significant drop of the target rotation speed from the actual rotation speed when the operator decreases the accelerator manipulating extent, and the state of elevation of actual rotation speed due to decrease of the output side load although the operator is keeping the same accelerator manipulating extent. In such a case, it is clever to increase the load to the prime mover itself, and the lock-up state in the intermediate lock-up state is canceled to transfer to the high speed mode. At this time, the displacement of the fluid pump/motor 7 is further increased slightly to nullify the transmission torque from the low speed side mechanical transmission line a to the center boss 13, and then the low speed side clutch 14 is disengaged.

On the other hand, in this intermediate lock-up mode, if the actual rotation speed of the prime mover 19 detected by the rotation speed sensor 56 is lower than the target rotation speed determined in correspondence with the accelerator manipulation amount over a specified width $\alpha$ (step 203 in FIG. 3), the high speed clutch 15 is disengaged to return to the low speed mode (step 104 in FIG. 3). Incidentally, lowering of the actual rotation speed from the target rotation speed over a specified width $\alpha$ means to include the state of the rotation speed of the prime mover 19 not going up to the corresponding level in spite of the increase of the accelerator manipulation amount by the operator, and the state of the actual rotation speed lowered as a result of increase of the output side load although the operator is keeping the same accelertor manipulation amount. In such a case, it is necessary to lessen the load to the prime mover 19, and the lock-up state in the intermediate lock-up mode is canceled to transfer to the low speed mode. Therefore, at the time of this transfer, the displacement of the fluid pump/motor 7 is slightly decreased to nullify the transmission torque from the high speed side mechanical transmission line b to the center boss 13, and then the high speed side clutch 15 is disengaged.

When transferred to the high speed mode, the mechanical transmission line b is formed between the first input, output end 1 of the differential mechanism 1 and the third input, output end 3, and part of the input power is directly transmitted to the output shaft 18 by way of this mechanical transmission line b. At this time, the fluid pump/motor 7 functions as the pump, while the other fluid pump/motor 8 works as the motor. That is, the torque of the second input, output end 2 of the differential mechanism 4 is transmitted to the output shaft 18 through the fluid transmission line $\beta$ formed between the two fluid pumps/motors 7, 8. In this high speed mode, as shown in FIG. 2, the displacement of the fluid pump/motor 7 is gradually increased, and after reaching the maximum displacement, the displacement of the other fluid pump/motor 8 is gradually decreased, so that the rotation speed of the output shaft 18 with respect to the rotation speed of the input shaft 25 increases.

In this case, the control of the displacement of the fluid pumps/motors 7, 8 is effected so that the target rotation speed corresponding to the accelerator manipulation amount and the actual rotation speed of the prime mover 19 detected by the rotation speed sensor may be equal to each other, by delivering operation command signals to the actuators 44, 45 (step 301 in FIG. 3).

In such high speed mode, when the difference in rotation speed between the low speed side clutch 14 and the high speed side clutch 15 becomes smaller than a specified value of $\beta$ (step 303 in FIG. 3), the operation transfer to the intermediate lock-up mode is the same procedure as mentioned above.

In this way, when the difference in rotation speed between the low speed side clutch 14 and the high speed side clutch 15 becomes smaller than a specified value, the aforesaid nonstep speed change control is interrupted, and the low speed side clutch 14 and the high speed side clutch 15 are both set in connected state, that is, the operation is forced to fall into the intermediate lock-up mode, and once set in the intermediate lock-up mode, the operation will not transfer to the high speed mode or low speed mode unless the deviation between the actual speed of the prime mover 19 and the target rotation speed exceeds the specified width. Therefore, if used for a relatively long period near the intermediate setting speed ratio $e_m$, frequent changeover of low speed side clutch 14 and high speed side clutch 15 is prevented. As a result it is possible to naturally extend the life of the clutches 14, 15, and the actuators 41, 42 for operating these clutches 14, 15.

What is more, in the intermediate lock-up mode, by controlling the displacement of the fluid pump/motor 7, the differential pressure between the circuit parts 31a, 31b is roughly controlled to zero, and accordingly the power transmission ratio of the fluid transmission lines A, B is nullified, so as to transmit the power only by the mechanical transmission lines a, b. Although the efficiency of the fluid pumps/motors 7, 8 used to compose the fluid transmission lines A, B is becoming higher every year, it is still inferior as compared with the mechanical transmission, and therefore, if the operation range to nullify the power transmission rate of the fluid transmission lines A, B can be preserved, the system efficiency can be enhanced. That is, as stated above, when controlled so as to render the differential pressure between circuits nearly to zero, the leak loss in the fluid pumps/motors 7, 8 is significantly decreased, and the torque loss depending on the pressure decreases. Accordingly, the energy loss in the fluid transmission lines A, B decreases, and the transmission efficiency of the nonstep speed change gear is dramatically improved. Therefore, if the actual rotation speed of the prime mover 19 is slightly different from said target rotation speed, the efficiency can be enhanced on the whole, and the fuel expenses can be saved. Thus, when the occasion of nearly nullifying the differential pressure between circuits in the fluid transmission lines increases during operation, the durability of the fluid pumps/motors 7, 8 and attached devices will be strengthened so much.

Figure 4:
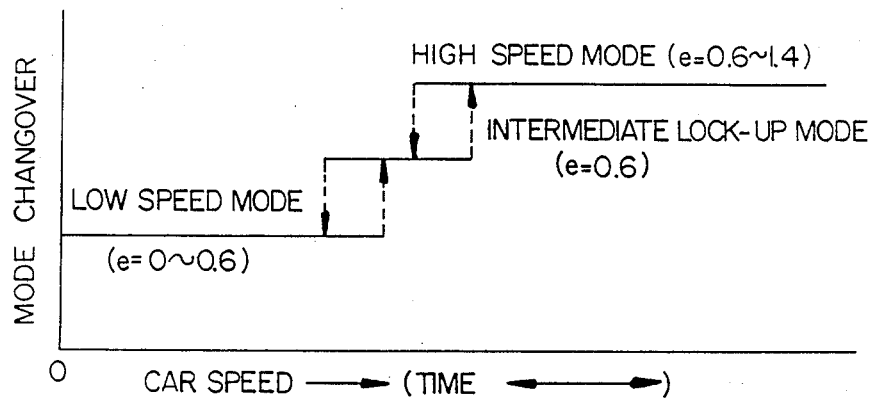
FIG. 4 is an explanatory diagram showing a mode changeover state.
Figure 5:
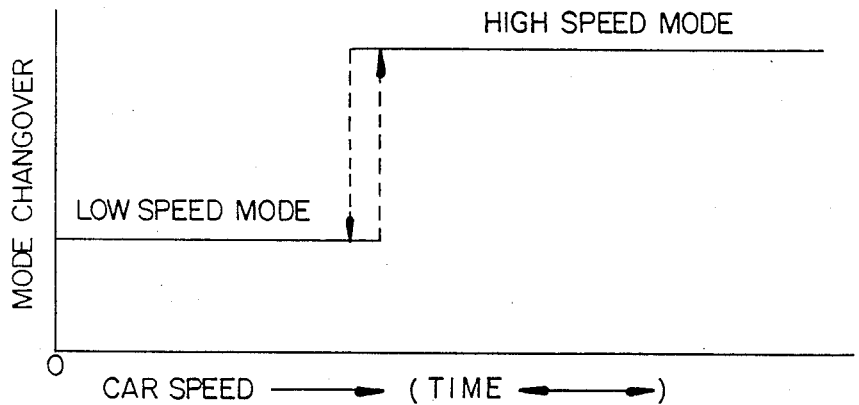
FIG. 5 is an explanatory diagram showing a conventional mode changeover state corresponding to FIG. 4.

FIG. 4 shows a mode changeover state of this embodiment for acceleration and deceleration, which is obviously different from the mode changeover state of the prior art shown in FIG. 5.

Meanwhile, the differential mechanism is not limited to the planet gear system as used in the foregoing embodiment.

Similarly, the structure of the fluid transmission mechanism is not eliminated to the constitution of the embodiment, and various modifications are possible, such as use of fixed capacity motor in one of the fluid pumps/motors.

Likewise, in the above embodiment, the input distribution system having the differential mechanism arranged at the input side is disclosed, but this invention can be similarly applied to the output distribution system.

What is claimed is:

1. A nonstep speed change gear, comprising:
   a differential mechanism having first, second and third input/output ends, and having a low speed and a high speed mechanical transmission line operation in parallel with one another, wherein said low speed mechanical transmission line operates through said first and second input/output ends, and said high speed mechanical transmission line operates through said first and third input/output ends, and further wherein power from a prime mover is supplied to said first input/output end;
   a fluid transmission mechanism having a two-part fluid circuit connecting a pair of fluid pump/motors, each pump/motor having an input/output shaft operatively connected to one of said transmission lines, respectively, in order to form a variable speed transmission line;
   a low speed clutch means for coupling and uncoupling said low speed mechanical transmission line with an output shaft;
   a high speed clutch means for coupling and uncoupling said high speed mechanical transmission line with said output shaft;
   clutch control means for controlling the coupling and uncoupling of said low and high speed clutch means, including means for detecting a speed ratio of the output speed of said output shaft to an input speed at said first input/output end, and wherein a predetermined intermediate speed setting ratio represents a condition in which the difference in rotation speeds between said low speed clutch means and said high speed clutch means is substantially zero, such that when said detected speed ratio is less than said intermediate speed setting ratio, only said low speed clutch means is coupled, when said speed ratio is greater than said intermediate speed setting ratio only said high speed clutch means is coupled, and when said speed ratio is within a predetermined range of said intermediate speed setting ratio, both said low speed clutch means and said high speed clutch means are coupled in an intermediate lock-up mode; and
   pump/motor control means for regulating the displacement of each pump/motor such that the differential pressure between each part of said two-part fluid circuit is substantially zero during said intermediate lock-up mode.

* * * * *

UNITED STATES PATENT AND TRADEMARK OFFICE
CERTIFICATE OF CORRECTION

PATENT NO. : 4,983,149
DATED : January 8, 1991
INVENTOR(S) : KITA

It is certified that error appears in the above-identified patent and that said Letters Patent is hereby corrected as shown below:

On the title page, item [63], should read --Continuation of Serial Number 333,813, April 6, 1989, abandoned, which is a Continuation of Serial Number 199,737, May 27, 1988, abandoned--.

On the title page, item [30], the priority date should read --May 30, 1987--.

Signed and Sealed this

Fifth Day of January, 1993

Attest:

DOUGLAS B. COMER

Attesting Officer

Acting Commissioner of Patents and Trademarks